US011847742B2

(12) United States Patent
Kuang et al.

(10) Patent No.: US 11,847,742 B2
(45) Date of Patent: *Dec. 19, 2023

(54) METHOD IN CONSTRUCTING A MODEL OF A SCENERY AND DEVICE THEREFOR

(71) Applicant: Meta Platforms, Inc., Menlo Park, CA (US)

(72) Inventors: Yubin Kuang, Lund (SE); Pau Gargallo Piracés, Barcelona (ES); Jan Erik Solem, Bjärred (SE); Johan Gyllenspetz, West Hollywood, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,066

(22) Filed: Feb. 3, 2022

(65) Prior Publication Data

US 2022/0230390 A1 Jul. 21, 2022

Related U.S. Application Data

(60) Continuation of application No. 16/856,648, filed on Apr. 23, 2020, now Pat. No. 11,282,271, which is a
(Continued)

(30) Foreign Application Priority Data

Jun. 30, 2015 (SE) .................................. 1550910-2

(51) Int. Cl.
*G06T 17/05* (2011.01)
*G06T 7/579* (2017.01)
*G06T 7/80* (2017.01)

(52) U.S. Cl.
CPC .............. *G06T 17/05* (2013.01); *G06T 7/579* (2017.01); *G06T 7/80* (2017.01);
(Continued)

(58) Field of Classification Search
CPC ........... G06T 7/579; G06T 7/80; G06T 17/05; G06T 2207/10016; G06T 2207/20072; G06T 2207/30244
See application file for complete search history.

(56) References Cited

U.S. PATENT DOCUMENTS 5,850,352 A 12/1998 Moezzi
8,818,081 B1 8/2014 Lookingbill
(Continued)

FOREIGN PATENT DOCUMENTS

WO 2005059473 6/2005
WO 2010071531 6/2010
(Continued)

OTHER PUBLICATIONS

Chatterjee et al., "Efficient and Robust Large-Scale Rotation Averaging", ICCV2013 Computer Vision Foundation, 8 pages.
(Continued)

*Primary Examiner* — King Y Poon
*Assistant Examiner* — Vincent Peren
(74) *Attorney, Agent, or Firm* — Van Pelt, Yi & James LLP

(57) ABSTRACT

A geographical area, which forms an area to be represented by a model of at least a portion of a scenery, is defined. A plurality of new images depicting the scenery is received. The plurality of new images is acquired by a camera from one or more positions within the geographical area. It is determined whether the plurality of new images fulfill a pre-defined updating criterion. In response to a determination that the plurality of new images fulfills the updating criterion, an update of the model is initiated. A boundary area enclosing the plurality of new images is defined. The boundary area is defined based at least in part on a distance margin between an edge of the boundary area and a new
(Continued)

image included in the plurality of new images that is closest to the edge of the boundary area.

20 Claims, 3 Drawing Sheets

Related U.S. Application Data division of application No. 15/740,934, filed as application No. PCT/EP2016/064911 on Jun. 28, 2016, now Pat. No. 10,672,186.

(52) U.S. Cl.
CPC .............. *G06T 2207/10016* (2013.01); *G06T 2207/20072* (2013.01); *G06T 2207/30244* (2013.01)

(56) References Cited

U.S. PATENT DOCUMENTS

| | | | |
|---|---|---|---|
| 9,891,321 | B2 | 2/2018 | Isaksson |
| 2002/0015048 | A1 | 2/2002 | Nister |
| 2007/0065002 | A1 | 3/2007 | Marzell |
| 2008/0297502 | A1 | 12/2008 | Simard |
| 2010/0204964 | A1 | 8/2010 | Pack |
| 2010/0238165 | A1 | 9/2010 | Watkins |
| 2011/0043613 | A1 | 2/2011 | Rohaly |
| 2015/0130799 | A1 | 5/2015 | Holzer |
| 2015/0172628 | A1 | 6/2015 | Brown |
| 2016/0210761 | A1 | 7/2016 | Pollefeys |
| 2020/0218690 | A1 | 7/2020 | Huston |

FOREIGN PATENT DOCUMENTS

| | | |
|---|---|---|
| WO | 2011093752 | 8/2011 |
| WO | 2013109742 | 7/2013 |
| WO | 2014112908 | 7/2014 |
| WO | 2014112911 | 7/2014 |

OTHER PUBLICATIONS

Christoph Strecha et al., "Dynamic and scalable large scale image reconstruction", 2010 IEEE Conference on Computer Vision and Pattern Recognition (CVPR) Jun. 13-18, 2010, San Francisco, CA, IEEE, Jun. 13, 2010.

Crandall et al., "Discrete-Continuous Optimization for Large-Scale Structure from Motion", 8 pages.

David Schleicher et al., "Real-Time Hierarchical GPS Aided Visual SLAM on Urban Environments", Feb. 15, 2009, Computer Aided Systems Theory—Eurocast 2009, Springer Berlin Heidelberg, pp. 326-333.

Diego Thomas, Akihiro Sugimoto: "A Two-Stage Strategy for Real-Time Dense 3D Reconstruction of Large-Scale Scenes", Computer-Vision—ECCV 2014 Workshops, vol. 8925, Mar. 19, 2015, pp. 428-442.

Enqvist et al., "Non-Sequential Structure from Motion", 8 pages.

Extended European Search Report for European Application No. 21163664.2, dated Jul. 7, 2021, 15 pages.

Farenzena et al., "Structure-and-Motion Pipeline on a Hierarchical Cluster Tree", 8 pages.

Gammeter S., et al., "Size Does Matter: Improving Object Recognition and 3D Reconstruction with Cross-Media Analysis of Image Clusters," 11th European Conference on Computer Vision, Heraklion, Crete, Greece, Proceedings, Part I, Advances in Intelligent Data Analysis XIX, Springer, International Publishing, Sep. 5-11, 2010, Jan. 1, 2010, vol. 6311, pp. 734-747, XP055712750.

Havlena et al., "Randomized Structure from Motion Based on Atomic 3D Models from Camera Triplets", 8 pages.

International Preliminary Report on Patentability for International Application No. PCT/EP2016/064911, dated Jan. 11, 2018, 17 Pages.

International Search Report and Written Opinion for International Application No. PCT/EP2016/064911, dated Jan. 2, 2017, 20 Pages.

Jiang et al., "A Global Linear Method for Camera Pose Registration", ICCV 2013 paper, Computer Vision Foundation, 8 pages.

Kume H et al., "Extrinsic Camera Parameter Estimation Using Video Images and GPS Considering GPS Positioning Accuracy", 2010 20th International Conference on Pattern Recognition (ICPR 2010): Istanbul, Turkey, Aug. 23, 2010, pp. 3923-3926.

Moulon et al, Global Fusion of Relative Motions for Robust, Accurate and Scalable Structure from Motion:, ICCV, Sydney, Australia, 2013, 8 pages.

Schleicher D., et al., "Real-Time Hierarchical GPS Aided Visual SLAM on Urban Environments," Computer Aided Systems Theory—Eurocast, Lecture Notes in Computer Science, Springer, 2009, vol. 5717, pp. 326-333.

Snavely et a., "Photo Tourism: Exploring Photo Collections in 3D", 12 pages.

Vergauwen M., et al., "Web-based 3D Reconstruction Service," Machine Vision and Applications, Springer, May 25, 2006, vol. 17, pp. 411-426.

Wilson et al, "Robust Global Translations with 1DSfM", Cornell University, Ithaca, NY, 15 pages.

Wu, "Towards Linear-time Incremental Structure from Motion", University of Washington, 8 pages.

METHOD IN CONSTRUCTING A MODEL OF A SCENERY AND DEVICE THEREFOR

CROSS REFERENCE TO RELATED APPLICATIONS

This application is a continuation of U.S. patent application Ser. No. 16/856,648 entitled METHOD IN CONSTRUCTING A MODEL OF A SCENERY AND DEVICE THEREFOR filed Apr. 23, 2020 that is incorporated herein by reference for all purposes, which is a divisional of U.S. patent application Ser. No. 15/740,934 entitled METHOD IN CONSTRUCTING A MODEL OF A SCENERY AND DEVICE THEREFOR filed Dec. 29, 2017 that is incorporated herein by reference for all purposes, which is a National Stage Entry under 25 U.S.C. § 371 of Patent Cooperation Treaty Application No. PCT/EP16/64911 entitled METHOD IN CONSTRUCTING A MODEL OF A SCENERY AND DEVICE THEREFOR filed Jun. 28, 2016 that is incorporated herein by reference for all purposes, which claims priority to Sweden Application No. 1550910-2 filed Jun. 30, 2015 that is incorporated herein by reference for all purposes.

TECHNICAL FIELD

The present invention relates to a method in constructing a model of a scenery based on images depicting the scenery. The present invention also relates to updating of the model when new images are acquired.

BACKGROUND

Structure from motion (SfM) refers to a process of estimating three-dimensional structures from a plurality of two-dimensional images. Two images, taken from two spatially different positions and/or taken in different rotational angles, might provide different views of a scenery depicting corresponding points in the scenery. By analysing how the corresponding points are related, a three-dimensional structure of objects in the scenery may be formed. The information of the corresponding points also allows relative positions and rotational angles of the acquired images to be determined.

By adding more images depicting further related views, the three-dimensional structure can be created with higher accuracy. This may be done in different ways. Incremental SfM is discussed in e.g. N. Snavely, et al, "Photo tourism: Exploring photo collections in 3D", ACM Transactions on Graphics (SIGGRAPH Proceedings), 25(3), 2006, 835-846.

Incremental SfM starts by reconstructing a model of the scenery from the view in two images and continue adding images one by one to the reconstruction until no additional images can be added. By carefully ensuring that each image is added without errors, the method can be used to reconstruct large sceneries with thousands of images. The main issues with incremental SfM are drifting of the model as images are added due to outliers and error accumulation. Also, incremental SfM is computationally complex since the complete reconstruction must be adjusted after each addition of a new image.

Use of additional information about the images, such as a GPS position or compass data of a camera that acquired an image, may provide a more accurate model. However, since the images are added one by one, such additional information can only be used for already added images, and therefore does not fully solve the problem of error accumulation and drifting.

An alternative approach to creating three-dimensional structures of objects in a scenery may be referred to as non-incremental SfM, or batch SfM, wherein all available images for creating three-dimensional structures are handled simultaneously, or in batch. Such an approach is described e.g. in M. Havlena, et al, "Randomized structure from motion based on atomic 3D models from camera triplets", IEEE Conference on Computer Vision and Pattern Recognition, 2009, 2874-2881.

Non-incremental SfM involves computing a three-dimensional reconstruction of the scenery or parts of scenery based on pairs or triplets of images. Then, a complete three-dimensional reconstruction is made, finding the absolute positions of all cameras that captured the images, where the absolute positions are most compatible with the computed three-dimensional reconstruction. Usually, the rotational angles of the cameras are first determined, and then the positions, or translations, of the cameras are determined. Finding the translation of cameras are harder since the relation between cameras in pairs of images does not give any information about the actual distance between cameras. Several methods suggest using point correspondences to fix the scale ambiguity. However, in such case, it is hard to use additional information such as GPS information, since the rotational angles of the cameras are calculated first.

SUMMARY OF THE INVENTION

It is therefore an object of the invention to provide a fast and accurate method for constructing a relation between cameras depicting a scenery. It is a particular object of the invention to provide a method which enables additional information regarding the cameras to be used in forming a model of the cameras.

These and other objects of the invention are at least partly met by the invention as defined in the independent claims. Preferred embodiments are set out in the dependent claims.

According to a first aspect of the invention, there is provided a method in constructing a model of a scenery, said method comprising receiving a plurality of images depicting the scenery, wherein each image is acquired by a camera from a position aiming at the scenery in a rotational angle; creating a plurality of sub-models, wherein each of the plurality of sub-models is created by: selecting a basis image among the plurality of images; determining related images among the plurality of images, wherein each related image is related to the basis image by means of a depicted part of the scenery in the related image and a depicted part of the scenery in the basis image are at least partly overlapping; and determining the sub-model based on the basis image and the related images, wherein the sub-model defines relative positions and rotational angles of the camera for the basis image and the related images and the sub-model further defines three-dimensional structures of objects depicted in the plurality of images; and separately merging the defined relative positions and rotational angles of cameras for the plurality of sub-models.

According to a second aspect of the invention, there is provided a device for constructing a model of a scenery, said device comprising a processor configured to: receive a plurality of images depicting the scenery, wherein each image is acquired by a camera from a position aiming at the scenery in a rotational angle; create a plurality of sub-models, wherein each of the plurality of sub-models is created by: selecting a basis image among the plurality of images; determining related images among the plurality of images, wherein each related image is related to the basis image by means of a depicted part of the scenery in the related image and a depicted part of the scenery in the basis image are at least partly overlapping; determining the sub-model based on the basis image and the related images, wherein the sub-model defines relative positions and rotational angles of the camera for the basis image and the related images and the sub-model further defines three-dimensional structures of objects depicted in the plurality of images; and separately merge the defined relative positions and rotational angles of cameras for the plurality of sub-models.

According to a third aspect of the invention, there is provided a computer program product comprising a computer-readable medium with computer-readable instructions such that when executed on a processing unit the computer program product will cause a processing unit to perform the method according to the first aspect of the invention.

The invention according to the first, second, and third aspects provides that a plurality of sub-models are created, wherein each sub-model forms three-dimensional structures of objects depicted and also provides information about the position and rotational angle of cameras that acquired the images. The sub-models may be created based on a large plurality of images, which implies that each sub-model may be very accurate and is not very sensitive to single images that are outliers being included in the creation of the sub-model.

Each sub-model may be created starting from a single basis image and using images that are all related to the basis image by depicting partly overlapping views of the scenery. This implies that the number of images that are part of creating the sub-model is limited to images that are overlapping with the basis image. Images that depict parts of the scenery that are not overlapping with the basis image will not be included in the creating of the sub-model. In this sense, the sub-model may be called an "atomic reconstruction" since it forms a reconstruction of the scenery based only on images that are all overlapping with a single basis image. The sub-models may also be called atomic reconstructions, since they are building blocks of a global reconstruction of the scenery.

In the context of this application, creating a sub-model by selecting a basis image among the plurality of images should be construed to include that not only a single basis image is selected but at least one basis image, such as a small set of basis images, may be selected. For instance, 2-5 images may be selected as basis images. Still a limited number of images may be overlapping with the small set of basis images and thus be part of creating the sub-model.

Each sub-model defines three-dimensional structures of objects depicted in the plurality of images and also defines relative positions and rotational angles of the camera for the basis image and the related images. The information determined in a plurality of sub-models is merged. However, according to the invention, merging is made separately for the relative positions and rotational angles of the cameras defined by the sub-models. Hence, in merging, the three-dimensional structures of objects in the scenery are not required, which implies that the merging may be relatively quickly performed.

Thus, according to the invention, a large plurality of images may be used in forming the sub-models, which implies that accurate information may be determined by the sub-models. This is combined with a merging of the sub-models, wherein only the positions and angles of the cameras are merged, such that the merging will not be very computationally complex.

In the context of the present application, the term "scenery" should be construed as any type of environment that may be depicted in an image. The scenery may thus, for instance, be a landscape, an urban environment, indoor or outdoor environments. The term "scenery" includes a large area that may not be depicted in a single image, such as a town or parts of a town. This implies that two images may both depict the same "scenery" even though they have no overlapping or corresponding points.

Further, each image is acquired by a camera being turned in a certain direction towards the scenery. In the context of this application, this direction towards the scenery is called a "rotational angle". As a plurality of images are acquired, they will form relative rotational angles between optical axes of the cameras acquiring each image, whereas a single image may be considered to form a rotational angle between the optical axis of the camera acquiring the image and a default direction. Each single image may also have a plurality of rotational angles between the optical axis of the camera acquiring the image and respective default direction. Using three rotational angles, the direction of the camera may be defined in a three-dimensional space.

According to an embodiment, the merging comprises calculating the relative position and rotational angle of the camera for the plurality of images based on the determined relative positions and rotational angles of the camera for the basis image and the related images of each of the sub-models. The plurality of sub-models may not fully agree on a position and rotational angle of a camera that acquired an image. Thus, the information from the plurality of sub-models may be merged to improve an accuracy of the information.

The sub-models provide a definition of positions and angles of the cameras that acquired the images. Since this information is separately merged, without merging representations of three-dimensional structures in the scenery, the invention also allows additional information to be used to influence a final determination of the positions and angles of the cameras.

According to an embodiment, the method further comprises receiving additional information for at least some of the plurality of images, said additional information providing an indication of the position or rotational angle of the camera, and the merging is further based on said additional information and comprises calculating absolute position and rotational angle of the camera for the plurality of images.

If additional information is available, the merging may thus further be based on the additional information. However, the additional information need not necessarily be used.

Such additional information may be acquired by external sensors. For instance, a camera that acquires an image may simultaneously acquire additional information, such as a position and/or orientation of the camera when acquiring the image. Thus, according to the embodiment, information of the position and rotational angle of a camera may both be decided based on the relation of the image to other images and on information acquired by external sensors. These different manners of determining information about the camera allow accurate representation of the scenery to be formed.

The additional information may e.g. be a position represented by a Global Positioning System (GPS) coordinate or a compass direction. Sensors for obtaining such additional information may often be provided in a camera.

According to an embodiment, the merging weights the plurality of sub-models and the additional information based on accuracy. The information representing positions and rotational angles of a camera may be obtained with differing reliability, e.g. depending on an accuracy of a sensor. Also, the relative positions and rotational angles of cameras defined by a sub-model may have an accuracy depending on the depicted objects and a number of images included in the sub-model. Thus, by weighting the merged information, the information used in the merging is given appropriate significance.

According to an embodiment, a basis image of a first sub-model is a related image of a second sub-model. This implies that a single image may be included in a plurality of sub-models and may thus contribute to the forming of a plurality of atomic reconstructions.

In one embodiment, a sub-model is created based on each image in a plurality of images of the scenery. Thus, a maximum amount of sub-models are created and the collected information is used as comprehensively as possible in order to provide a very accurate determination of the positions and rotational angles of the cameras.

Further, according to an embodiment, all images in the plurality of images of the scenery that relate to a basis image by depicting overlapping parts of the scenery are used in creating the sub-model. Hence, a large amount of information based on a large amount of images may be used such that each sub-model may be very accurate.

According to an alternative, a limited number of related images are used. When a large number of images are used in creating a sub-model, the accuracy of the sub-model may not increase very much when further images are included in the creating of the sub-model. Thus, in order to limit the computational complexity of creating sub-models, the number of images may be limited to a pre-defined maximum number.

According to an embodiment, the plurality of images are represented as a graph, wherein each image is represented by a node in the graph and relations between images are represented by edges between nodes, and wherein said determining of related images comprises starting in a basis node of the graph representing the basis image and selecting nodes that are connected by an edge to the basis node, wherein the selected nodes represent the related images. A graph may be a useful way of representing relations of a large number of images. Thus, the graph may also be advantageously used for quickly determining the images to be included in the creation of each sub-model.

The graph may also provide information in the edges regarding the similarity of two connected images and, thus, how closely related they are to each other. Such a similarity measure may be used in a decision to limit a number of images to be used as related images in creation of a sub-model. For instance, only images that have a similarity measure exceeding a pre-defined threshold in relation to the basis image may be included in creation of the sub-model.

According to an embodiment, the scenery may constitute a pre-defined geographical area. This implies that only sub-models formed from images that belong to the pre-defined geographical area will be merged in the determination of positions and rotational angles of cameras. This may be very useful if images are collected from a very large geographical area or even the entire earth. Several geographical areas may thus be defined and the positions and rotational angles of cameras acquiring the images may then be separately determined for each pre-defined geographical area.

According to an embodiment, the method further comprises receiving further images, wherein each further image is acquired by a camera from a position, and the position of the camera is within the pre-defined geographical area. Hence, the scenery to be modeled may be pre-defined and when further images are acquired, only images within the pre-defined area may be allowed to contribute to improvement of the model.

According to an embodiment, the method further comprises updating the model by updating the sub-models taking the further images into account and merging the defined relative positions and rotational angles of cameras for the plurality of updated sub-models. Thus, in updating, the sub-models are re-computed based on the increased number of images before the information of the updated sub-models is merged. Hence, the quality of the final model improves as new images become available.

According to an embodiment, the updating is triggered when a predetermined number of further images are received. Since the updating includes re-computing of sub-models, it may not be desirable to perform such re-computing every time a new image is received. Therefore, the updating may be performed based on the number of further images exceeding a predetermined number.

According to a fourth aspect of the invention, there is provided a method for updating a model of a scenery, wherein the model is based on a plurality of images depicting the scenery, said model defining three-dimensional structures of objects depicted in the plurality of images, said method comprising: defining a geographical area, which forms an area to be represented by the model; receiving a plurality of new images depicting the scenery, wherein each new image is acquired by a camera from a position and said position is within said geographical area; determining whether the plurality of new images fulfill a pre-defined updating criterion; and initiating an update of the model when said number of new images fulfills the updating criterion.

According to a fifth aspect of the invention, there is provided a computer program product comprising a computer-readable medium with computer-readable instructions such that when executed on a processing unit the computer program product will cause a processing unit to perform the method according to the fourth aspect of the invention.

According to the fourth and fifth aspects of the invention, a plurality of geographical areas may be defined to be represented by respective models. The union of all geographical areas can be as large as to cover the whole world. Thus, the geographical area may be defined to be smaller than an area being depicted by available images. This implies that the amount of information used in determining a model of a scenery may be limited.

Thanks to the use of the geographical area, new images may be assigned to the geographical area, e.g. based on positional information acquired from an external sensor when acquiring the image. Hence, the images may be assigned to a model before performing any updating of a model of a scenery. Rather, the updating may be triggered by a pre-defined updating criterion being fulfilled.

According to an embodiment, the updating criterion is a number of new images. Thus, updating may only be triggered when a pre-determined number of new images have been received. Such an updating criterion may be used to ensure that there is a lot of new information for updating the geographical area.

According to another embodiment, the updating criterion may be a ratio between the number of new images and the number of images previously used in the model. This may be used in order to ensure that the additional information of the new images may amount to a significant share of the total information to be used in the model, such that the updating may be relevant.

According to yet another embodiment, the updating criterion may be related to a part of the geographical area. Hence, if new images are received from a particularly interesting part of the geographical area or a part of the geographical area having a low number of previously used images, updating may be triggered.

According to another embodiment, the method further comprises defining a boundary area enclosing the plurality of new images, wherein the boundary area is defined with a margin between an edge of the boundary area and a new image among the plurality of new images which is closest to the edge of the boundary area.

Images may be assigned to a geographical area based on a position of the camera when acquiring the image. However, camera positions at the border of the geographical area may only depict scenery outside the geographical area. This implies that such images may be difficult to relate to the other images taken inside the geographical area. Hence, by defining a boundary area enclosing the new images with a margin, it may be assumed that the new images only provide information which is relevant to a scenery defined by the boundary area. Then, the boundary area may be compared to a plurality of defined geographical areas to determine which geographical areas that the boundary area intersects. Based on this comparison, models for each geographical area intersected by the boundary area may be updated.

Also, one image may belong to several defined geographical areas. This may be relevant when the image depicts parts of several geographical areas.

BRIEF DESCRIPTION OF THE DRAWINGS

The above, as well as additional objects, features and advantages of the present inventive concept, will be better understood through the following illustrative and non-limiting detailed description of preferred embodiments of the present invention, with reference to the appended drawings. In the drawings like reference numerals will be used for like elements unless stated otherwise.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

A plurality of images may depict a scenery from different positions and at different rotational angles. The plurality of images may allow navigation through the scenery by e.g. the images being presented in a sequence. In order to allow navigation through the scenery, a plurality of images may be acquired and relations between the images may be determined.

Each image is acquired by a camera in a position and at three rotational angles, i.e. defining a direction in which the camera is aimed. The position and rotational angles may be useful information in order to choose an image to be presented during navigation through the scenery and in order to adapt a presentation or displaying of the image. In forming a basis for navigation through the scenery, it may further be of interest to create a model of the scenery based on the plurality of images.

Hence, having a plurality of acquired images depicting a scenery, it is desired to create a model of the scenery and to determine position and rotational angles of cameras that acquired the images.

Thus, three-dimensional structures of objects in the scenery are to be modeled. It should be understood that the structure could be of any form and represent any object. The plurality of images can be arranged in arbitrary order and taken from any position. The plurality of images can further be taken both inside and outside of a structure or object.

When acquiring an image, a camera may also determine additional information, e.g. by means of other sensors in the camera. For instance, the camera may acquire a GPS position and compass information providing a detection of the position and rotational angle of the camera when the image was acquired. This information may be acquired with low accuracy, but may be provided as input in analysis of the plurality of images for determining a model of the scenery having higher accuracy.

Figure 1:
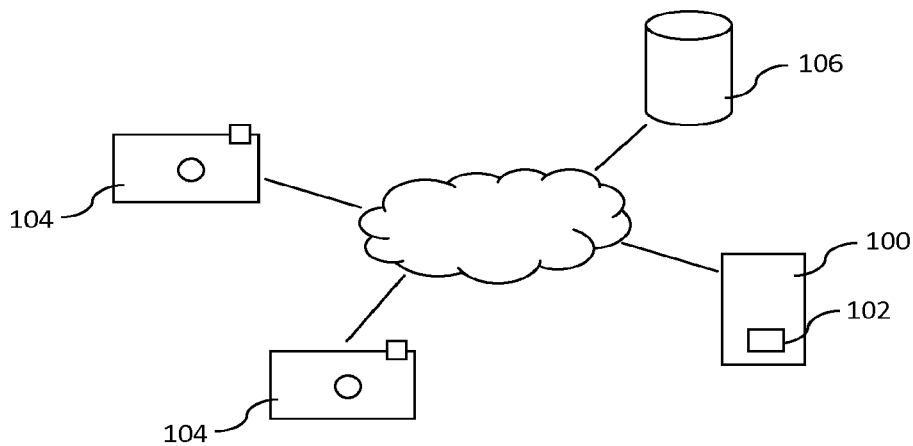
FIG. 1 is a schematic view of a system, in which a device according to an embodiment of the invention is arranged.

A system for constructing a model of a scenery will first be described with reference to FIG. 1. The system may comprise a device 100 having a processing unit 102 for executing computer instructions. The device may be a server 100, providing large computing capacity. The server 100 may be arranged to receive information from cameras 104, which acquire images of a scenery. The cameras 104 may send images to the server 100 via any type of wired or wireless communication, e.g. over a computer network, such as the Internet. The server 100 may thus collect images. According to one alternative, the cameras 104 may send acquired images to one or more different computer units, which may analyze the images and relate the images to each other. The server 100 may thus access a database 106 comprising the acquired images, and the database 106 may comprise information for constructing a model of a scenery depicted by the images.

The processing unit 102 may run a computer program controlling the processing unit 102 to perform a method for constructing a model of the scenery. The computer program may be implemented in hardware or software, or any combination thereof. Hence, the computer program may e.g. be implemented as an Application Specific Integrated Circuit (ASIC) or Field-Programmable Gate Array (FPGA) or as software which may be loaded into a general-purpose processing unit in order to be executed by the processing unit.

Figure 2:
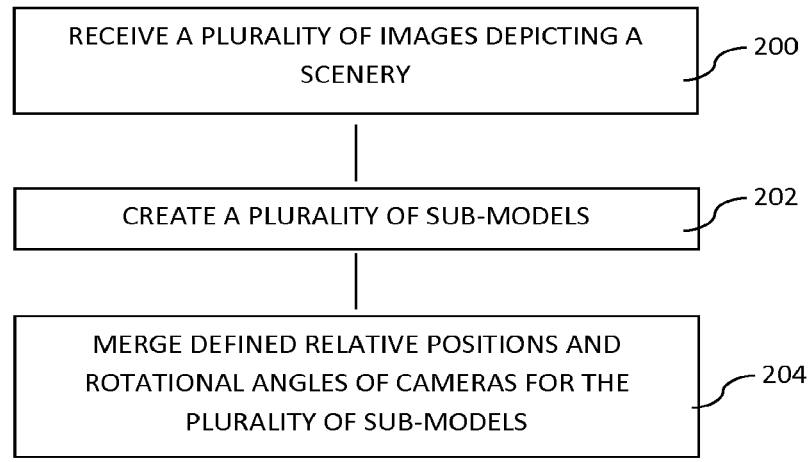
FIG. 2 is a flow chart of a method for creating a model of a scenery according to an embodiment of the invention.

A method for constructing a model of a scenery will now be generally described with reference to FIG. 2. The method comprises receiving a plurality of images depicting the scenery, step 200. As described above, these images may be received from different cameras 104, such that the device 100 collects the images. Alternatively, a database 106 comprising the plurality of images may be separately formed and the plurality of images may be accessed from this database 106, when a model is to be constructed.

The method comprises creating a plurality of sub-models, step 202. As will be further described below, each sub-model may provide a reconstruction of at least part of the scenery based on a sub-set of the plurality of images. Each sub-model defines relative positions and rotational angles of the cameras 104 acquiring the images on which the sub-model is formed. The sub-model further defines three-dimensional structures of objects depicted in the plurality of images.

The method further comprises separately merging the defined relative positions and rotational angles of cameras 104 for the plurality of sub-models, step 204. Thus, the three-dimensional structures of objects are not required when merging the positions and rotational angles of the cameras 104. This implies that the merging may be rather quickly performed, since only a fraction of the information of the sub-models is used in the merging.

The merging may provide a very accurate modeling of the relative positions and rotational angles of cameras 104. The merging may also use additional information in order to improve the modeling and which may allow determining absolute positions and rotational angles of the cameras 104.

When the absolute positions and rotational angles of the cameras 104 have thus been determined, this information may be used in order to compute the three-dimensional structures of objects in the scenery.

The different steps of the method will now be described in more detail.

Figure 3:
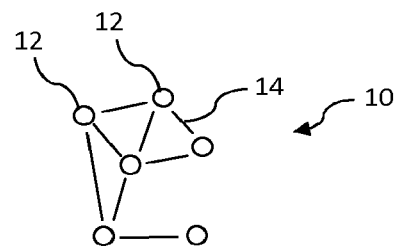
FIG. 3 is a schematic view of a representation of a plurality of images.

Referring to FIG. 3, the plurality of images may be represented by a graph 10. The graph 10 is created by determining relations between images. Each image is represented as a node 12 in the graph 10. Nodes 12 may be connected to each other by edges 14 representing a transition from the image in one node to the image in the connected node. Edges 14 are thus formed between images that are related to each other. Images are related when they depict overlapping parts of the scenery.

The nodes 12 may also store further information about the image, such as additional information about the image. The additional information may e.g. be information captured by other sensors when the image was acquired.

The edges 14 may also provide a relation between the images connected by the edge 14. This may be a similarity measure representing a measure of how closely related the images are to each other. Such similarity measures may be determined by analysis of the images.

Figure 4:
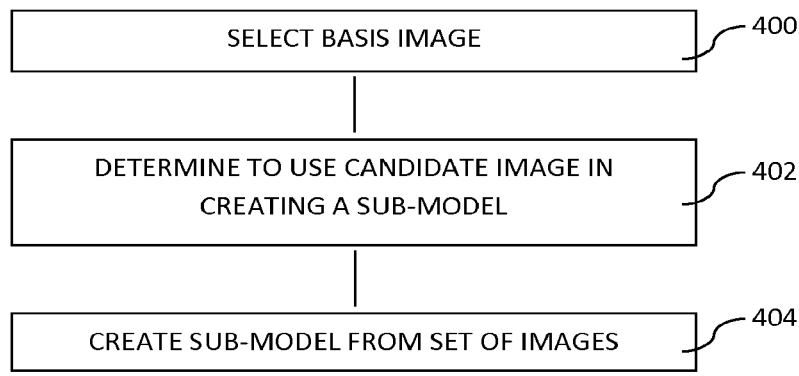
FIG. 4 is a flow chart of a method for creating a sub-model according to an embodiment of the invention.

Referring now to FIG. 4, a method of creating a sub-model will be described. This may be done based on the graph 10 providing relations between images. However, the plurality of images need not necessarily be represented in a graph 10 in order for a sub-model to be able to be created. The sub-model may be formed based on geographic proximity of images, e.g. based on GPS positions, allowing a choice of images to be analyzed whether they are to be included in creation of the sub-model.

First, the plurality of images is analyzed in order to match features (interest points) between images. A feature that is present in many images may be used to chain (or connect) a number of images that include the feature. Thus, based on a three-dimensional point in the scenery, a so-called track may be formed, which chains together all images that depict the three-dimensional point. Such a track may thus be formed as a number of edges 14 between nodes 12 in the graph 10.

When a sub-model is to be created, a basis image is first selected, step 400. This basis image may thus include a number of three-dimensional points for which tracks have been formed. Using these tracks, candidate images are chosen from the plurality of images, where each candidate image shares a sufficient number of tracks with the basis image.

A candidate image is then analyzed together with the basis image in order to determine whether a reconstruction of the scenery may be formed by the candidate image and the basis image together. The reconstruction thus provides a representation of three-dimensional structures of objects in the images. If a reconstruction may be successfully made, a determination is made to use the candidate image in creating the sub-model, step 402. The candidate image may thus be added to a set of images for forming the reconstruction. The next candidate image to be included may then be analyzed together with the set of images in order to determine whether it may successfully be added for forming a reconstruction of the scenery.

In this manner, a set of images is determined on which a reconstruction may be formed. Since all images that are included in forming the reconstruction are selected based on sharing tracks with the single basis image, the reconstruction will hereinafter be called "atomic reconstruction". Thus, an atomic reconstruction forms a sub-model of the scenery.

As described above, an atomic reconstruction may be created by using an incremental approach, wherein candidate images are sequentially added to the reconstruction. It should be realized that the atomic reconstruction may be alternatively created using a global reconstruction approach, wherein a large number of candidate images are analyzed in a batch to create the atomic reconstruction.

An atomic reconstruction is thus created from the set of images, comprising the basis image and the selected candidate images, step 404. The candidate images to be tested whether they are to be included in the set of images may be all images that are related to the basis image. For instance, all images represented by a candidate node in the graph 10 having an edge 14 connecting the candidate node to the node of the basis image may be tested.

Alternatively, the candidate images to be tested may only be the images that share more than a defined number of tracks with the basis image. This implies that the candidate image has a relatively high correspondence to the basis image and that it is likely that the candidate image may eventually be used in the set of images. The candidate images to be tested may also be selected in other ways. For instance, only candidate images having a similarity above a defined threshold to the basis image, as represented by a similarity measure of an edge 14 in the graph 10, may be chosen for testing.

Also, if there are a huge number of available images, a threshold of images to be used in creating the atomic reconstruction may be set. For instance, it may be determined that an atomic reconstruction of sufficient quality will be created when the number of images in the set of images exceeds a threshold. Then, the set of images may be chosen as the most similar candidate images that may be added to the set of images while the number of images does not exceed the threshold.

The atomic reconstruction may define the three-dimensional structures of objects that may comprise the three-dimensional points on which the tracks are formed. The three-dimensional structures in the atomic reconstruction may be positioned in an arbitrary reference coordinate system.

The atomic reconstruction may further define the relative positions and rotational angles of the cameras 104 that acquired the images included in the set of images. Since the atomic reconstruction may be based on a large number of images included in the set of images, the positions and rotational angles of the cameras 104 may be determined with high accuracy.

In an embodiment, at least three candidate images are determined to be included in the set of images. This implies that the atomic reconstruction is based on at least four images and that a relatively high accuracy of the model created by the atomic reconstruction may be achieved. However, at least some atomic reconstructions may be based on fewer images.

A plurality of atomic reconstructions may be created as described above. The plurality of atomic reconstructions may be created based on using each image in the plurality of images as a basis image. However, this implies that a very large number of atomic reconstructions are created and it may not be necessary for creating a model of the scenery with sufficient quality.

Thus, in an embodiment, only some of the images may be selected as basis images. According to one embodiment, a certain percentage of images may be selected as basis images. For instance, 50% of the images may be selected as basis images for creating atomic reconstructions. It should be realized that other percentages may be used and that the selection of which images to be used as basis images may be based on a number of different factors, such as similarity between the basis images.

Figure 5:
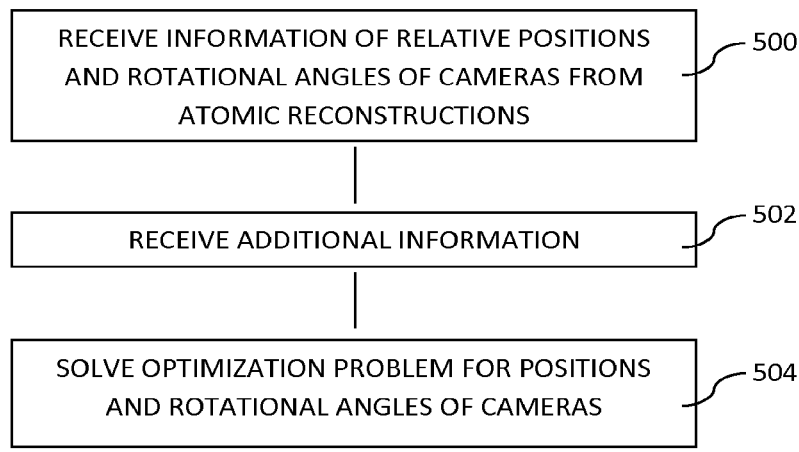
FIG. 5 is a flow chart of a method for merging sub-models according to an embodiment of the invention.

Referring now to FIG. 5, merging of information from a plurality of atomic reconstructions will be described.

The merging of the atomic reconstruction may be performed based on only part of the information from the atomic reconstruction. The merging may be based solely on the relative positions and rotational angles of the cameras 104. Hence, the information of the relative positions and rotational angles of the cameras 104 as determined by each of the atomic reconstructions may be received as input to the merging, step 500.

The merging may further be based on additional information, which may be captured by external sensors of the camera, such as GPS, accelerometer, and compass. Thus, such additional information for at least some of the images may also be received as input to the merging, step 502. However, it should be realized that such additional information may not always be available and the merging of the atomic reconstructions may in one embodiment be performed without using additional information.

The additional information may be used to determine the absolute positions and rotational angles of the cameras 104. Thus, the relative positions and rotational angles of the cameras 104 which may be determined by the atomic reconstructions may further be converted to a global, absolute coordinate system using the additional information.

The additional information may be mixed with the information from the atomic reconstructions to perform the merging. Soft constraints may be set on the included information in performing the merging, such that the included information may be used in accordance with its accuracy or reliability.

According to an embodiment, the merging is formulated as an optimization problem, which is solved for the positions and rotational angles of the cameras 104, step 504. The information of positions and rotational angles of the cameras 104 from the atomic reconstructions and the additional information may be considered simultaneously in the optimization problem.

The variables of the optimization problem may comprise the positions and rotational angles of the cameras 104 and the scale of the atomic reconstructions in an absolute reference frame. A cost function may be formulated, wherein each representation of a position and rotational angle of a camera 104 (from an atomic reconstruction or from additional information) is compared to a solution for the position and rotational angles of the cameras 104. Thus a solution is to be determined wherein the cost function is minimized.

Terms of the cost function may thus penalize the deviation of a position or rotational angle of a camera 104 as determined by the atomic reconstruction or the additional information from a candidate solution to the position or the rotational angle of the camera 104. This deviation may be differently penalized based on an accuracy or reliability of the information. For instance, if a GPS position is determined with low accuracy or reliability, a large error in comparison to the candidate solution should not be heavily penalized. Thus, the cost function may be a weighted sum of deviations. In one embodiment, the cost function may be formulated as:

$$E(C) = \sum_i \sum_{j \in \{camera\ in\ i\}} E_{relative}(s_i, C_i, C_j) + \sum_i E_{absolute}(C_i),$$

where i is an atomic reconstruction, $C_i$ is the candidate solution of the absolute positions and rotational angle of a camera 104, $E_{relative}$ measures the difference between the relative position of $C_i$ and $C_j$ and the relative position obtained by scaling the atomic reconstruction of image i by a factor $s_i$. The difference is weighted according to the uncertainty of the atomic reconstruction. Further, $E_{absolute}$ measures the difference between values of the additional information and the candidate solution $C_i$. The difference is weighted according to an estimated uncertainty of measurements on which the additional information is based.

The cost function is a sum of terms measuring discrepancies of different types of information. The terms may therefore be weighted to enable adding of the terms to provide a meaningful sum.

For the additional information which may be obtained by measurements, measurement errors may be expected to have a Gaussian distribution around 0. Then, an inverse standard deviation of the measurement may be used as a weighting factor of the error of the additional information. For some sensors capturing additional information, the standard deviation may be provided by the sensor. However, the standard deviation may also be unknown and, then, a default value for the type of information may be used.

For the relative position of the cameras 104 in the atomic reconstructions, a way of evaluating their uncertainty is also needed. When building the atomic reconstruction, a bundle adjustment may be used to minimize the reprojection error of the three-dimensional point in the images. The reprojection error is a difference between the position of the reprojected point as determined by the reconstruction and the position where the track was detected in the image. By assuming an uncertainty on the position of the tracks, an uncertainty of the recovered camera positions may be inferred. In one embodiment, this may be given by a covariance matrix of the camera positions as estimated from a cost function of the bundle adjustment.

When positions and rotational angles of the cameras 104 have been determined based on the merging as described above, the three-dimensional structures of the atomic reconstructions may also be merged to form a merged model of the scenery depicted by the plurality of images. In this regard, the positions and rotational angles of the cameras 104 may be used as fixed information, which will control the merging of the three-dimensional structures.

Figure 6:
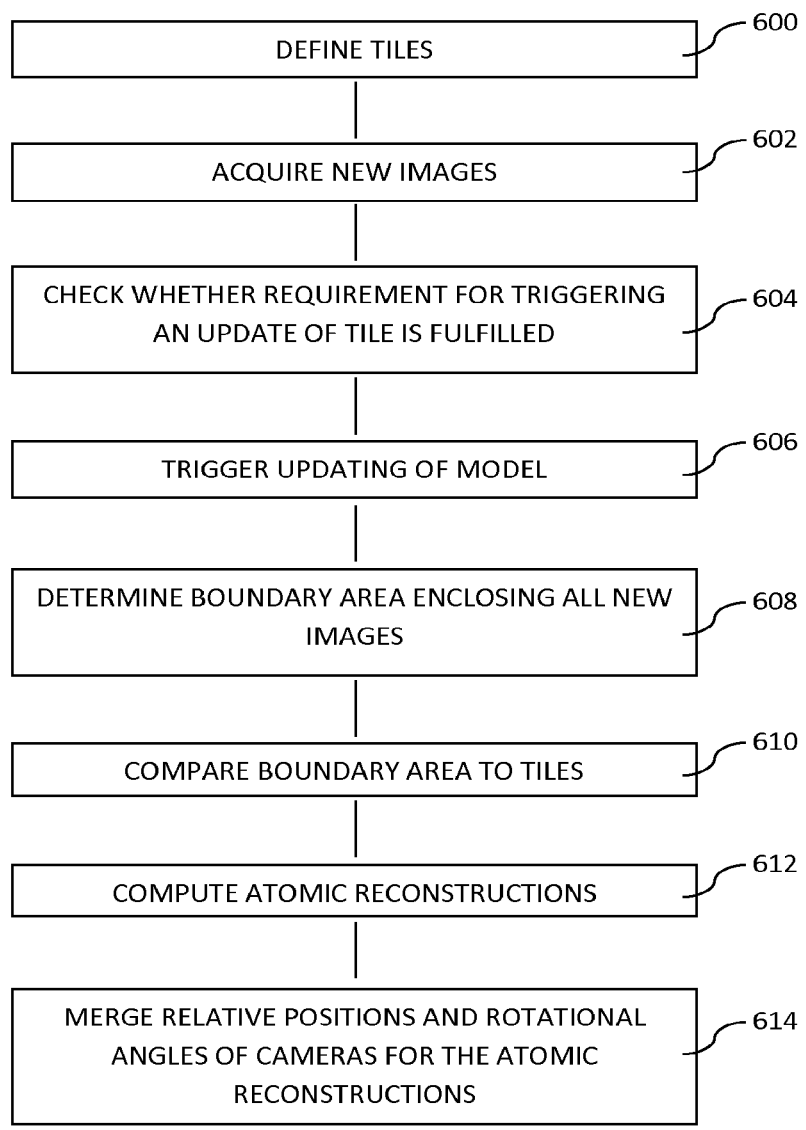
FIG. 6 is a flow chart of a method for updating a model of a scenery according to an embodiment of the invention.

It is possible to further improve the created model of the scenery. For instance, new images of the scenery may be acquired at a later stage, when the model has already been created. A method for updating the model will therefore be described with reference to FIG. 6.

Geographical grids may be defined in order to define tiles formed by the grids, step 600. A tile may define an area of the scenery to be modeled. The model of the scenery may thus be limited to the area of the tile, which allows limiting the computations required for forming the model. The geographical grid may define a large number of tiles that are arranged adjacent to each other, wherein the scenery of each tile may be represented by its respective model.

The geographical grids may define rectangular tiles of substantially equal sizes. However it should be realized that the tiles may alternatively be of varying sizes and of varying shapes. The tiles may also be dynamically defined and may be adapted to a density of images that are acquired in the geographical area defined by the tile.

New images may thus be acquired and intended to be included in the model, step 602. In order to not perform unnecessary updates, certain requirements may be set for triggering an update. A requirement may be that a certain number of new images need to be added to a tile before performing an update of the tile. Another requirement may be that a certain ratio of new images in relation to the already present images in the plurality of images needs to be added to a tile before performing an update of the tile. Another requirement may be that a new image is added to a specific part of the geographical area defined by the tile. The tiles may have different requirements for triggering updates. The requirements may further be changed.

A new image may be assigned to a tile based on, for example GPS position obtained by the camera that acquired the image. When a plurality of new images has been received and assigned to a specific tile, a control may be made whether requirements for triggering an update of the tile are fulfilled, step 604. If so, updating of a model of the scenery may be triggered, step 606.

When updating is triggered, a boundary area may first be determined enclosing all the new images in the tile, step 608. The boundary area may be defined to enclose the new images with a margin, such that there is at least a pre-defined distance between an edge of the boundary area and the position of a new image closest to the edge. The boundary area may be a definition of a geographical region that is affected by the new images.

Before updating is performed, it is not known in detail what portions of a scenery that may be depicted by a new image. It may merely be known from what position the image was acquired. Hence, the new image may depict parts that are even outside the geographical area of the tile. Therefore, the boundary area may be defined having a margin between an edge of the boundary area and the position of a new image closest to the edge.

The boundary area may then be compared to the tiles, step 610 in order to determine which tiles that are affected by the new images. Hence, all tiles with which the boundary area overlaps may be determined to be affected. The affected tiles may thus be chosen for updating and updating of the model for each of the affected tiles may be triggered.

When an update is made, the new images may be matched to existing images. Relations between the new images and the existing images may thus be determined and a graph representation 10 of the plurality of images may be updated. Thus, the new images may be analyzed in order to update the tracks formed in the plurality of images. Possibly, new tracks may be formed based on information in the new images.

Then, atomic reconstructions are again computed based on the updated tracks, step 612, as described above with reference to FIG. 4. Further atomic reconstructions may also be formed using some or all of the new images as basis images.

Thereafter, the relative positions and rotational angles of the cameras 104 as determined by the atomic reconstructions may be merged, step 614, as described above with reference to FIG. 5. Thus, an updated model of the positions and rotational angles of the cameras 104 is determined and may be used to also update a model of three-dimensional structures of the scenery.

The person skilled in the art realizes that the present invention by no means is limited to the preferred embodiments described above. On the contrary, many modifications and variations are possible within the scope of the appended claims.

The invention claimed is:

1. A method, comprising:
defining a geographical area, which forms an area to be represented by a model of at least a portion of a scenery, wherein the model defines three-dimensional structures of objects depicted in a plurality of images;
receiving a plurality of new images depicting the scenery, wherein the plurality of new images is acquired by a camera from one or more positions within the geographical area;
determining whether the plurality of new images fulfill a pre-defined updating criterion;
in response to a determination that the plurality of new images fulfills the updating criterion, initiating an update of the model;
defining a boundary area enclosing the plurality of new images, wherein the boundary area is defined based at least in part on a distance margin between an edge of the boundary area and a new image included in the plurality of new images that is closest to the edge of the boundary area; and
updating the model based at least in part on the boundary area.

2. The method of claim 1, wherein the updating criterion is based on a new image being added to a specific part of the geographical area, wherein the specific part of the geographical area is a part of the geographical area that lacks previous images or that has a number of previous images that is below a threshold.

3. The method of claim 1, wherein the updating criterion is based on a determination that the plurality of new images includes new information, including new three-dimensional scenery points.

4. The method of claim 1, wherein the updating criterion is based on a new image that is acquired by the camera with a position and rotational angle that was not previously used in the model.

5. The method of claim 1, wherein defining the geographical area comprises assigning the plurality of new images to one or more tiles from a geographical grid.

6. The method of claim 1, wherein defining the geographical area comprises adapting tiles of a geographical grid to a density of the plurality of new images, such that the tiles are dynamically defined.

7. The method of claim 1, wherein the geographical area is defined based on the one or more camera positions of the received plurality of new images.

8. The method of claim 1, wherein an image of the plurality of new images is used to update more than one model, the more than one model representing more than one geographical area.

9. The method of claim 1, wherein the model comprises a plurality of sub-models, wherein each of the plurality of sub-models has, at a creation of the model or at a prior update of the model, been computed by:
   selecting a basis image among the plurality of images on which the model is based;
   determining related images among the plurality of images on which the model is based;
   determining the sub-model based on the basis image and the related images, wherein the sub-model defines relative positions and rotational angles of the camera for the basis image and the related images and the sub-model further defines the three-dimensional structures of objects depicted in the plurality of images; and
   separately merging the defined relative positions and rotational angles of cameras for the plurality of sub-models;
   wherein updating the model comprises re-computing the sub-models based on the plurality of new images, and merging the defined relative positions and rotational angles of cameras for the plurality of re-computed sub-models.

10. The method of claim 9, further comprising receiving additional information for at least some of the plurality of new images and wherein merging the defined relative positions and rotational angles of cameras for the plurality of re-computed sub-models is further based on said additional information and comprises calculating absolute position and rotational angle of the camera for the plurality of images.

11. The method of claim 10, wherein the merging the defined relative positions and rotational angles of cameras for the plurality of re-computed sub-models weights the plurality of re-computed sub-models and the additional information based on accuracy.

12. The method of claim 1, wherein updating the model further comprises updating a graph, wherein the graph represents the plurality of images on which the model is based, wherein each of the plurality of images, on which the model is based, is represented by a node in the graph and relations between images are represented by edges between nodes.

13. A system, comprising:
   one or more processors configured to:
      define a geographical area, which forms an area to be represented by a model of at least a portion of a scenery, wherein the model defines three-dimensional structures of objects depicted in a plurality of images;
      receive a plurality of new images depicting the scenery, wherein the plurality of new images is acquired by a camera from one or more positions within the geographical area;
      determine whether the plurality of new images fulfill a pre-defined updating criterion;
      in response to a determination that the plurality of new images fulfills the updating criterion, initiate an update of the model;
      define a boundary area enclosing the plurality of new images, wherein the boundary area is defined based at least in part on a distance margin between an edge of the boundary area and a new image included in the plurality of new images that is closest to the edge of the boundary area; and
      update the model based at least in part on the boundary area; and
   a memory coupled to the one or more processors, wherein the memory is configured to provide the one or more processors with instructions.

14. The system of claim 13, wherein the updating criterion is based on a new image being added to a specific part of the geographical area, wherein the specific part of the geographical area is a part of the geographical area that lacks previous images or that has a number of previous images that is below a threshold.

15. The system of claim 13, wherein the updating criterion is based on a determination that the plurality of new images includes new information, including new three-dimensional scenery points.

16. The system of claim 13, wherein the updating criterion is based on a new image that is acquired by the camera with a position and rotational angle that was not previously used in the model.

17. The system of claim 13, wherein an image of the plurality of new images is used to update more than one model, the more than one model representing more than one geographical area.

18. The system of claim 13, wherein updating the model further comprises updating a graph, wherein the graph represents the plurality of images on which the model is based, wherein each of the plurality of images, on which the model is based, is represented by a node in the graph and relations between images are represented by edges between nodes.

19. The system of claim 13, wherein the model comprises a plurality of sub-models, wherein each of the plurality of sub-models has, at a creation of the model or at a prior update of the model, been computed by:
   selecting a basis image among the plurality of images on which the model is based;
   determining related images among the plurality of images on which the model is based;
   determining the sub-model based on the basis image and the related images, wherein the sub-model defines relative positions and rotational angles of the camera for the basis image and the related images and the sub-model further defines the three-dimensional structures of objects depicted in the plurality of images; and
   separately merging the defined relative positions and rotational angles of cameras for the plurality of sub-models;
   wherein updating the model comprises re-computing the sub-models based on the plurality of new images, and merging the defined relative positions and rotational angles of cameras for the plurality of re-computed sub-models.

20. A computer program product, the computer program product being embodied in a non-transitory computer readable storage medium and comprising computer instructions for:

defining a geographical area, which forms an area to be represented by a model of at least a portion of a scenery, wherein the model defines three-dimensional strictures of objects depicted in a plurality of images;

receiving a plurality of new images depicting the scenery, wherein the plurality of new images is acquired by a camera from one or more positions within the geographical area;

determining whether the plurality of new images fulfill a pre-defined updating criterion;

in response to a determination that the plurality of new images fulfills the updating criterion, initiating an update of the model;

defining a boundary area enclosing the plurality of new images, wherein the boundary area is defined based at least in part on a distance margin between an edge of the boundary area and a new image included in the plurality of new images that is closest to the edge of the boundary area; and updating the model based at least in part on the boundary area.

* * * * *